April 17, 1956

H. K. BIGELOW 2,742,386

METHOD OF SECURING BRAKE LININGS TO BRAKE SHOES

Filed May 18, 1953

INVENTOR.
HARRY K. BIGELOW
BY
Warren H. F. Schmieding
ATTORNEY

United States Patent Office 2,742,386
Patented Apr. 17, 1956

2,742,386
METHOD OF SECURING BRAKE LININGS TO BRAKE SHOES

Harry K. Bigelow, Columbus, Ohio

Application May 18, 1953, Serial No. 355,839

10 Claims. (Cl. 154—81)

The present invention relates generally to machines for securing brake linings to brake shoes, and more particularly to an improved method for bonding a brake lining to a brake shoe.

In general, brake linings are bonded to brake shoes by means of application of heat and pressure to an assembled shoe and lining. A suitable brake lining machine is illustrated and described in co-pending application of Overman et al., Serial No. 98,988 filed June 14, 1949, now Patent No. 2,653,644. Such a machine includes a platen or anvil, for supporting the assembled brake shoe and lining, a means for heating the platen where heat is to be used in the bonding process, and means for applying and maintaining pressure over the brake shoe and lining during the bonding operation.

With brake lining machines of the above type, the temperature at which the heated platen is maintained and the time during which the assembled shoe and lining are maintained in contact with the lining, are variables which must be controlled depending on the type of bonding agent being used and depending on the heat transfer characteristics of the brake shoe. Such variables must be controlled to produce the proper temperature at the bonding line i. e. the junction of the shoe and lining.

Furthermore, the proper temperature at the bonding line must be maintained for sufficient time for the bonding agent to react or set. It is desirable, from the standpoint of saving time on each bonding operation, to heat the shoe and cause reaction of the bonding agent as rapidly as possible. At the same time, excessive heating of the lining material must be avoided, so that the original curing temperature at which the lining was manufactured, will not be exceeded. Excessive heating of the lining composition will "recure" the lining and adversely affect or completely ruin the desired physical characteristics of the lining.

It has been found that with certain conventional automotive brake shoes, and with certain conventional bonding agents, a platen temperature of approximately 500° F. is satisfactory. At such platen temperature 8 to 14 seconds of heat transfer time is required to produce a temperature of approximately 325° F. at the bonding line. When the temperature of 325° F. is reached, an additional 8 seconds of time is required for reaction of the bonding agent when the method of the present invention is employed. After the 8 seconds have transpired, the shoe and lining can be removed from the heated platen and a strong, continuous junction between the lining and shoe will have been produced. With methods prior to the present invention, higher periods of curing time, up to 30 minutes duration, were required to produce a satisfactory junction between a shoe and lining.

Brake linings which are commonly used in motor vehicles are composed of long wearing, fibrous, material such as asbestos, or the like. A binder is added so that the composition can be molded to the desired shape. The binders used are of various types, but generally the physical state of a particular binder is a function of the temperature to which the lining composition is subjected. Hence the curing temperature of the lining, during manufacture, must be controlled in order to obtain the desired physical characteristics whereby the proper coefficient of friction for the finished lining is obtained. In addition, the lining is manufactured under controlled conditions so that the composition will be permeable; such permeability allows the lining composition to "breathe" or gas off during the application of heat and pressure to the lining such as occurs in bonding, and under severe operating conditions which may occur during operation of a motor vehicle.

In order for modern brake linings to efficiently perform their function of stopping a vehicle, such linings must continually wear, or sluff off, during operational use in a vehicle braking system; such continual wearing is necessary so that the lining will continue to present a braking surface, having the proper coefficient of friction, to the confronting surface of the brake drum against which the lining is compressed in operation of the brakes of the vehicle.

If brake linings are ever excessively heated, to a temperature above the curing temperature of the composition, the required physical characteristics obtained by controlled manufacturing, will be destroyed. As a result, the required frictional and permeable characteristics of the lining will be lost. The lining will become glazed and hard, taking on the appearance of a plastic rather than its original fabric-like appearance. Such a glazed and hardened lining is extremely wear resistant, but of very little value as a stopping agent since the coefficient of friction of the braking surface of the lining will be greatly lowered.

From the foregoing it will be understood that excessive heating, and hence undesirable hardening and loss of permeability of brake linings should be avoided both during the bonding operation, when the lining is being secured to a brake shoe, and during operational use of the lining on a motor vehicle.

The bonding agents generally used, which are interposed between a shoe and lining to form a junction thereof, comprise substances which flow and react under the application of the heat and pressure, such as natural or synthetic resins or the like.

The bonding agent may be applied either to the shoe, or to the lining, or it may be in the form of strips of impregnated tape, or it may be painted on by the person conducting the bonding operation. In other instances the lining manufacturer may supply linings with the bonding agent already applied to the under surface of the lining. The application of heat and pressure causes the bonding agent to react and flow. When the bonding agent sets, the lining is secured to the shoe.

During the reaction in setting of the bonding agent, gases are evolved between the surfaces being bonded. Prior to the present invention, a substantial portion of the gases evolved, during the reaction of the bonding agent, was trapped between the lining and the shoe and within the permeable composition of the lining. Such gases were trapped within the lining by the confining action of the pressure applying means, which means included a metal strap in contact with the upper surface of the lining, with the strap serving to apply the necessary pressure to the lining and shoe when in assembled relationship on the heated platen. With such an arrangement, prior to the present invention, only a small portion of the gases evolved during bonding, were permitted to escape from the lining and the bonding agent, with such gas escape occurring only at the side and end edges of the lining and bonding agent layer. As a result, after setting of the bond, and after raising of the pressure applying strap to release the pressure on the lining, gases would shoot out wardly, at high velocity, from between the lining and shoe, with the result that at each point of gas expulsion, the bonding agent would be blasted outwardly, under impetus of the gas pressure, thereby destroying the bond at points of gas expulsion.

The present method accomplishes continual venting of the gases, during the period of the curing of the bond, thereby preventing the build up of high pressure gas pockets in the bonding agent, and in the lining composition, with the result that the undesirable blasting out of the set bonding agent can be completely avoided. This results in efficiently bonded areas, of high strength, with each area forming a continuous and uniform bond between the lining and the shoe. Moreover, by continually venting the gases as they are formed, a pressure build up, and hence a heat build up, in the lining composition is avoided. Such continual venting has the beneficial result that the frictional and permeable characteristics of the lining composition are not destroyed by excessive heat and pressure. Hence the lining material remains permeable in composition, permitting the lining to "breathe" or convey gases away from points of entrapment, both during bonding and during operational use. By means of the present method of continually venting and passing off of the gases formed during bonding, linings which are bonded to brake shoes by the present method have been found to be more resistant to the occurrence of objectionable glazing and hardening during operational use. This beneficial characteristic is believed to be achieved for the following reasons; since the gas which is formed and evolved during the setting of the bonding agent, is allowed to continually escape, the build up of pressure within the permeable lining composition, and hence the build up of heat therein is avoided. Hence any compacting of the permeable lining composition, due to pressure, is avoided, and any hardening of the binder in the lining composition is avoided. In addition, since the build up of gas pressure at the points of entrapment, the corresponding build up of heat, which accompanies the application of pressure to a confined gas, is also avoided. It should be noted that in practicing prior methods, where heat and pressure were allowed to build up in the lining material, the two variables, namely heat and pressure, were mutually aggravative; i. e. a build up in pressure was accompanied by a rise in temperature and conversely, a rise in temperature produced a build up in pressure such that what was initially slight, as far as the magnitude of the heat and pressure was concerned, would rapidly become profoundly detrimental in destroying the necessary permeable and frictional characteristics of the lining composition.

It is therefore seen, that by the present method of continually venting the gases away from points of gas formation and entrapment, and away from the interior of the permeable lining composition, the present method protects the physical characteristics produced in the lining by the manufacturer.

The present invention has the further advantage of avoiding even slightly excessive conditions of heat and pressure in lining composition. By prior methods such slightly excessive conditions were common. The physical characteristic of the lining composition would be only partially destroyed in that permeability would be slightly lessened. Such partial destruction of the physical characteristics would not be apparent after the bonding of the lining to the shoe, yet the desired permeability of the lining material would be invisibly hampered so that when the lining was later put into operational use, the lining could not successfully "breathe" or gas off. Hence additional hardening and additional decrease in permeability would more readily occur during heating from operational use. That is, in instances where a lining was placed on a motor vehicle, with such lining having its permeability previously decreased during bonding, pressure and heat would build up within the lining quicker, and under less operational braking load, than would be the case if the lining had retained its original degree of permeability according to the composition specification of the lining manufacturer.

As an additional advantage of the present method, I have discovered that brake linings bonded by the present method will not produce objectionable squealing in operational use, such objectionable squealing having been an annoying characteristic incident to prior bonding methods.

With the foregoing advantages of the present invention having been set forth, it will be understood that bonding material is not applied between the entire confronting surfaces of the liner and shoe being bonded, but only between certain spaced portions of the confronting surface areas. Although a smaller total bonding area is utilized as compared to prior methods in practicing the present method, for any given shoe and liner size, the bonded areas provided by the present invention are continuous and uniform such that the shoe is retained more securely to the liner even though the area of bond is not as great as prior methods. Moreover, with the present invention the spaced bonded areas provide the above described advantages whereby the desirable physical characteristics of liner material are maintained during operational use.

Further objects and advantages of the present invention will be apparent from the following description, reference being had to the accompanying drawings wherein a preferred form of embodiment of the invention is clearly shown.

Figure 1:
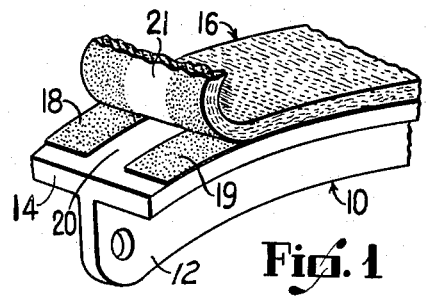
Fig. 1 is perspective view of a brake shoe and lining which have been bonded by the present method.

Referring to the drawing, Fig. 1 shows a perspective view of a conventional brake shoe at 10; such brake shoe is of the type used on passenger cars and trucks. The shoe 10 consists of a webbed portion 12 joined to a flanged portion 14.

A conventional brake lining 16 is shown in assembled relationship with the shoe. It should be noted that such brake linings are generally of rigid, arcuate configuration, being molded of a permeable composition, and Fig. 1 shows the end of the lining 16 in rolled back configuration for the purpose of illustrating the pattern of disposition of the bonding agent, which agent is disposed between the confronting surfaces of the shoe and the lining.

It will be seen from Fig. 1 that the bonding agent is disposed in stripes 18 and 19 which extend lengthwise of the shoe and lining. Intermediate the stripes of bonding agent lies an untreated portion 20 of the upper surface of the brake shoe, and a confronting untreated portion 21 on the lower surface of the brake lining. It should be noted that the stripes 18 and 19, of the bonding agent, may be applied to the shoe, to the lining, or such stripes may be in the form of impregnated tape which can be placed between the surfaces to be bonded prior to bonding. In other instances, linings are furnished, by the manufacturer, with a suitable bonding agent already applied to the lower surface of the lining.

Figure 2:
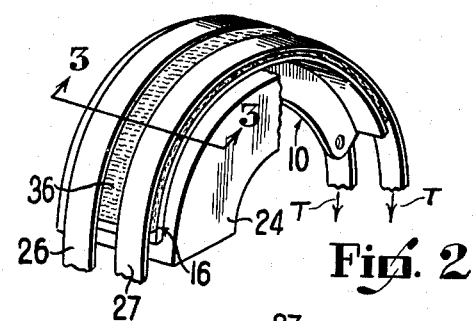
Fig. 2 shows a brake shoe and lining of the present invention in place on a platen which platen serves to support and apply heat to the shoe and lining.

Fig. 2 shows the shoe and lining of Fig. 1 in place on a platen 24. Such platen serves as means for supporting and applying heat to a shoe and lining during the bonding process. A plurality of flexible arcuately disposed straps 26 and 27 may be seen in Fig. 2. The straps 26 and 27 provide means for applying pressure to the shoe and lining so that the confronting surfaces thereof can be pressed together during bonding. Such pressure application is accomplished by imparting relative motion between the straps 26 and 27 and the platen 24.

Suitable mechanism, not shown, is provided in the bonding machine for applying tensional forces to the ends of the straps 26 and 27, as is indicated by the arrows T in Fig. 2. Such mechanism should include a suitable linkage for distributing the total force equally to the two straps 26 and 27. Suitable actuating means for the mechanism may be in the form of a pneumatic cylinder, and the linkage may be of the single-tree type, with such a mechanism being shown and described in detail in copending application of Overman et al., Serial No. 98,988, filed June 14, 1949.

Figure 3:
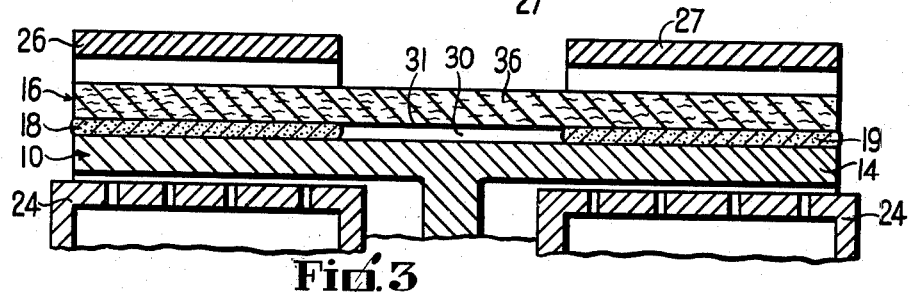
Fig. 3 is a sectional view of the shoe and lining of Fig. 2 with the section being taken substantially along the line 3—3 of Fig. 2.

Fig. 3 is a cross sectional view of the shoe 10 and lining 16 in assembled relationship, on a platen 24 and ready for the bonding operation. The pressure applying straps 26 and 27 are shown spaced from the upper surface of the lining. From this cross sectional view of Fig. 3, it will be seen that the stripes 18 and 19, of bonding agent, are preferably of substantially the same width as the pressure applying straps 26 and 27. Hence the spaced interval 30, bounded by the stripes 18 and 19 of bonding agent and by the confronting surfaces of the shoe and lining, forms a channel or air space, free of bonding material, which air space extends along the arcuate length of the lining 16. As is seen in Fig. 3, a central portion 31 of the upper surface of the lining will not be contacted or covered by the pressure applying straps during the bonding operation.

Figure 4:
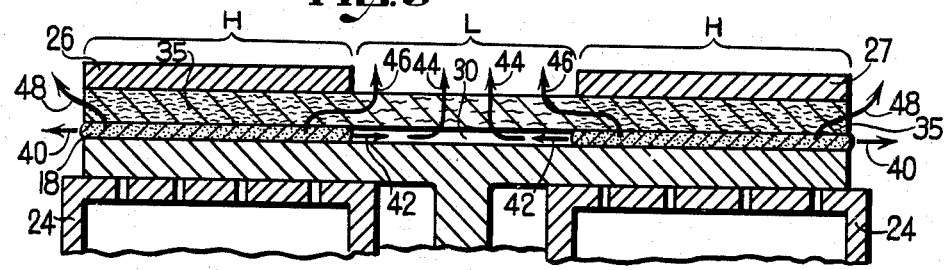
Fig. 4 is a second sectional view corresponding to the view of Fig. 3.

In Fig. 4, the brake shoe 10 and lining 16, of the preceding figures, are again shown with the pressure applying straps 26 and 27 being drawn downwardly against the upper surface of the lining. Pressure is being applied to the shoe and lining, and the shoe and lining have been heated by means of heat transfer from the platen 24. Under these conditions, the shoe and lining are being subjected to a bonding operation. As is seen in Fig. 4, the side portions 35 of the lining, which portions lie under the pressure applying straps 26 and 27, will be subjected to pressure and consequently compacted and densified. The portions of the total width of the lining, which are subjected to high pressure, are indicated by the widthwise extension of the brackets H in Fig. 4. The portion of the lining which is subjected to relatively low pressure is delineated by the bracket L in Fig. 4.

It should be noted that the side portions 35 of the lining are not only densified by the application of pressure thereto, but such side portions 35 have the upper surfaces thereof covered by the under surfaces of the straps 26 and 27. It should be remembered that the composition of the lining, as manufactured, is actually permeable; hence it will be realized that the application of pressure, to the areas indicated by the brackets H, will decrease the permeability of the portion 35 of the lining, due to compacting thereof, and furthermore, the straps 26 and 27 will cover and seal the porous outlets at the upper surface of the lining.

Figure 5:
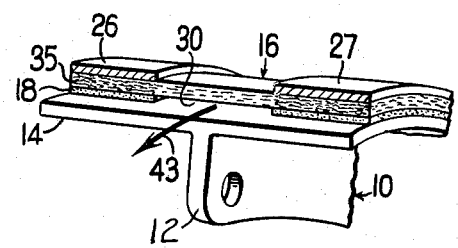
Fig. 5 is a perspective view of the end of the shoe and lining of the preceding figures.

The bonding agent which forms the stripes 18 and 19, is generally of a type which is caused to flow and set upon the application of heat and pressure. It is characteristic of such bonding agents to evolve gases during the setting reaction. In accordance with the present invention, when gases are evolved from the bonding agent, such gases will be discharged outwardly from the outer edges of the stripes 18 and 19, as indicated by the arrows 40. Gas will also be discharged inwardly from the inner edges of the stripes 18 and 19 as indicated by the arrows 42. The gases evolved at 42 will pass into the air space 30. Some of the gases will then pass outwardly from the open ends of the air space 30, as indicated by the arrow 43—best seen in Fig. 5. Other portions of the evolved gases will be diffused upwardly through the permeable central portion 36 of the lining, and then outwardly through the uncovered surface 31, with such latter path of gas escape being indicated by the arrows 44. It should further be noted that gases which diffuse upwardly into the compacted side portions 35 of the liner will follow the path of least resistance into the more permeable central portion 36, which is under relatively low pressure, and then upwardly and outwardly through the surface 31 to the atmosphere. Such latter path of gas discharge is indicated by the arrows 46 in Fig. 4. In a like manner, gases will be discharged from the edges of the lining material as indicated by the arrow 48.

It should be stressed, that with bonding agents commonly used, the volume of gas evolution, from the bonding agent, is of considerable magnitude such as to be a significantly detrimental force to the bonding technics employed prior to the present invention. Applicant's presently disclosed method of venting the gases, away from the points of confinement, was never contemplated or practiced. As a result, in the course of such prior practices, after the setting of the bonding agent, and upon the raising of the pressure applying means upwardly to remove the pressure from the lining, the confined gases would shoot outwardly from points along the outer edge of the layer of bonding agent. Such outwardly shooting gases would blast out sections of the set bonding agent and produce sharp reports comparable to the reports of a low caliber rifle. At such points of outward blasting of the gases, the bonding agent was removed and the union of the shoe and lining at such points was destroyed.

In contrast, when the method of the present invention is practiced, the trapping of gases between the shoe and lining is substantially avoided by the continual venting of such gases during their formation. When the pressure applying straps 26 and 27 are raised, there is no outwardly blasting of trapped gases, with such condition being pointedly emphasized by the absence of the sharp reports that were encountered in prior methods. Hence the layer of bonding agent remains continuous and unbroken. A further beneficial result of the present method resides in the fact that such method avoids the decreasing of the permeability and coefficient of friction of the lining material. As a result, such lining will remain permeable and be able to "breathe" or gas off during operational use and the proper frictional characteristics, built into the lining by the manufacturer, will be maintained.

Figure 6:
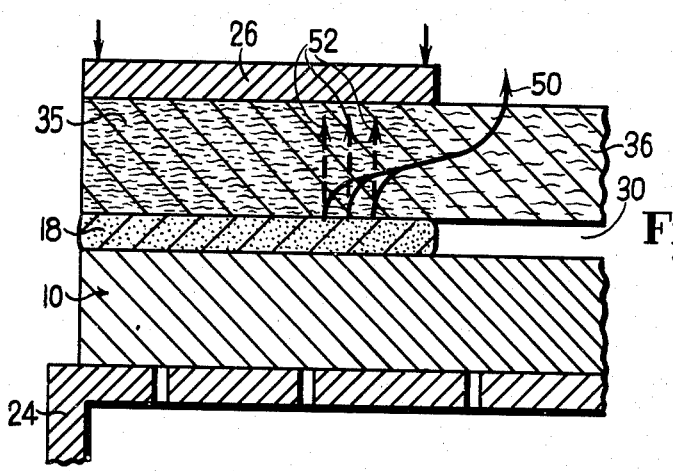
Fig. 6 is partial sectional view of a brake shoe and lining in the process of being bonded by the present method, the section is taken along the line 3—3 of Fig. 2.

A further separate advantage of the present method will now be set forth. With the foregoing in mind, and with reference to Fig. 6, it will be seen that certain of the gases, evolved from the bonding agent, will be diffused upwardly into the lining, and even into the relatively dense side portions 35 of such lining, the path of such gases being indicated by the arrows 50. If the low pressure central portion 36 of the lining were not provided, the gas from the dense portion 35 could not pass into the more permeable portion 36, as shown by the arrows 50; instead, the gases would be diffused vertically upwardly along the path indicated by the dotted vertical arrows 52 and remain confined within the lining. As a result, prior to the present method, areas of high pressure would build up along the path of the dotted vertical arrows 52, with such high pressure being aggravated by the restriction of gas passage due to densification of the lining material under pressure, and also due to the sealing action of the pressure applying strap 26. With the excessive pressure build up along the dotted path 52, as was the case with prior methods, such pressure build-up was accompanied by increased heating of the lining composition, at such high pressure points, in accord with the fundamental gas laws. The concurrent build-up of heat and pressure, encountered in prior methods, presented a condition wherein the heat and pressure were mutually aggravative, causing a rapid rise in temperature of the lining in response to a relatively small increase in the temperature of the platen and shoe. It will therefore be seen, that in practicing prior methods, the avoidance of excessive heating of the lining composition was a critical operation as compared to the present invention whereby objectional heat and pressure build-ups are avoided by the continual venting of the gases along the path indicated at 50 in Fig. 6. Excessive heating of a lining, during bonding, and the undesirable results thereof, are matters of degree. That is to say, the lining material may be only partially damaged with its permeability only partially decreased. In bonding by prior methods, partial damage of the lining material frequently occurred without such condition being apparent, since it is only in instances where the outer surface of the lining takes on a hard, glazed appearance that the partial damage is visually apparent. However, it should be emphasized, that even a partial decrease in permeability of a lining is detrimental to the operational effectiveness of such lining in performing its function in the brake system of a motor vehicle. During operational abuse, the lining will become heated by friction with the result that gases will be evolved as was the condition during bonding. Hence it will be realized that it is necessary that the lining material retain its permeability so the lining can properly "breathe." If the lining material is partially damaged, due to excessive heat application during bonding, the material will be more readily susceptible to additional damage, and the composition of the material will soon be plasticized to the extent that the permeability will be completely destroyed. Although such linings are very hard, with the result that they will be highly wear-resistant, at the same time, the braking efficiency will be extremely low.

Hence it will be seen that the present invention provides an improved junction of a lining to a brake shoe with such junction comprising continuous, strong, and uniform bonds. Moreover, the composition of the lining is protected, during bonding, from the detrimental effects of excessive heat, such that the lining retains the desirable physical characteristics provided by the manufacturer.

I claim:

1. In securing linings to brake shoes wherein a bonding agent is utilized and gas is generated during the bonding process, the method of producing an improved junction of lining to shoe which junction includes continuously and uniformly bonded area portions, said method comprising applying a bonding agent at the junction of a brake shoe and lining, and applying pressure to the lining and shoe at spaced intervals along the junction to effect the venting of gas from the spaces lying between the areas of pressure application.

2. In securing linings to brake shoes wherein a bonding agent is utilized and gas is generated during the bonding process, the method of producing an improved junction of lining to shoe which junction includes continuously and uniformly bonded area portions, said method comprising applying a bonding agent at the junction of a brake shoe and lining, and applying pressure to the shoe and lining over spaced band-shaped areas, said areas extending between opposite edges of the lining to effect the venting of gas from the spaces lying between the areas of pressure application.

3. In securing linings to brake shoes wherein a bonding agent is utilized and gas is generated during the bonding process, the method of producing an improved junction of lining to shoe which junction includes continuously and uniformly bonded area portions, said method comprising applying a bonding agent at the junction of a brake shoe and lining, and applying pressure to the shoe and lining over spaced band-shaped areas, said areas extending lengthwise of the lining to opposite ends thereof to effect the venting of gas from the spaces lying between the areas of pressure application.

4. In securing linings to brake shoes wherein a bonding agent is utilized and gas is generated during the bonding process, and wherein the lining is of porous composition, the method of producing an improved junction of lining to shoe which junction includes continuously and uniformly bonded area portions, said method comprising applying a bonding agent at the junction of a brake shoe and lining, and applying pressure to the shoe and lining, over spaced areas whereby areas of relatively low pressure are developed between the areas of pressure application to effect the venting of gas through the pores in the portions of the lining subjected to relatively low pressure.

5. In securing linings to brake shoes wherein a bonding agent is utilized and gas is generated during the bonding process, and wherein the lining is of porous composition, the method of producing an improved junction of lining to shoe which junction includes continuously and uniformly bonded area portions, said method comprising applying a bonding agent at the junction of a brake shoe and lining, and applying pressure to the shoe and lining, over spaced areas whereby areas of relatively low pressure are developed between the areas of pressure application to effect the venting of a portion of the gas through the pores in the portions of the lining subjected to relatively low pressure, and to effect the venting of a second portion of the gas outwardly from edges of portions of the junction subjected to relatively low pressure.

6. In securing linings to brake shoes wherein a bonding agent is utilized and gas is generated during the bonding process, the method of producing an improved junction of lining to shoe which junction includes continuously and uniformly bonded area portions, said method comprising applying bonding agent between the shoe and lining over spaced areas, applying pressure to the shoe and lining over areas corresponding with the areas of bonding agent to effect the venting of gas from the spaces lying between the areas of pressure application.

7. In securing linings to brake shoes wherein a bonding agent is utilized and gas is generated during the bonding process, the method of producing an improved junction of lining to shoe which junction includes continuously and uniformly bonded area portions, said method comprising applying bonding agent between the shoe and lining over spaced band-shaped areas, said areas extending between opposite edges of the lining, and applying pressure to the shoe and lining over areas corresponding with the areas of bonding agent to effect the venting of gas from the spaces lying between the areas of pressure application.

8. In securing linings to brake shoes wherein a bonding agent is utilized and gas is generated during the bonding process, the method of producing an improved junction of lining to shoe which junction includes continuously and uniformly bonded area portions, said method comprising applying bonding agent between the shoe and lining over spaced band-shaped areas, said areas extending lengthwise of the lining to opposite ends thereof, and applying pressure to the shoe and lining over areas corresponding with the areas of bonding agent to effect the venting of gas from the spaces lying between the areas of pressure application.

9. In securing linings to brake shoes wherein a bonding agent is utilized and gas is generated during the bonding process, and wherein the lining is of porous composition, the method of producing an improved junction of lining to shoe which junction includes continuous and uniformly bonded area portions, said method comprising applying bonding agent between the shoe and lining over spaced areas, and applying pressure to the shoe and lining over areas corresponding with the areas of bonding agent whereby areas of relatively low pressure are developed between the areas of pressure application to effect the venting of gas through the pores in the portions of the lining subjected to relatively low pressure.

10. In securing linings to brake shoes wherein a bonding agent is utilized and gas is generated during the bonding process, and wherein the lining is of porous composition, the method of producing an improved junction of lining to shoe which junction includes continuous and uniformly bonded area portions, said method comprising applying bonding agent between the shoe and lining over spaced areas, and applying pressure to the shoe and lining over areas corresponding with the areas of bonding agent whereby areas of relatively low pressure are developed between the areas of pressure application to effect the venting of a portion of the gas through the pores in the portions of the lining subjected to relatively low pressure, and to effect the venting of a second portion of the gas outwardly from edges of portions of the junction subjected to relatively low pressure.

References Cited in the file of this patent

UNITED STATES PATENTS

| | | |
|---|---|---|
| 1,890,425 | Whitworth | Dec. 6, 1932 |
| 1,983,464 | Kitchen | Dec. 4, 1934 |
| 2,416,427 | Bonawit et al. | Feb. 25, 1947 |
| 2,478,165 | Collins | Aug. 2, 1949 |
| 2,515,746 | Urbano | July 18, 1950 |
| 2,554,297 | Crossman | May 22, 1951 |
| 2,653,644 | Overman et al. | Sept. 29, 1953 |